May 19, 1942.　　　　K. DIENST　　　　2,283,319
VERTICAL GRAIN DRIER
Filed June 11, 1938　　　3 Sheets-Sheet 2
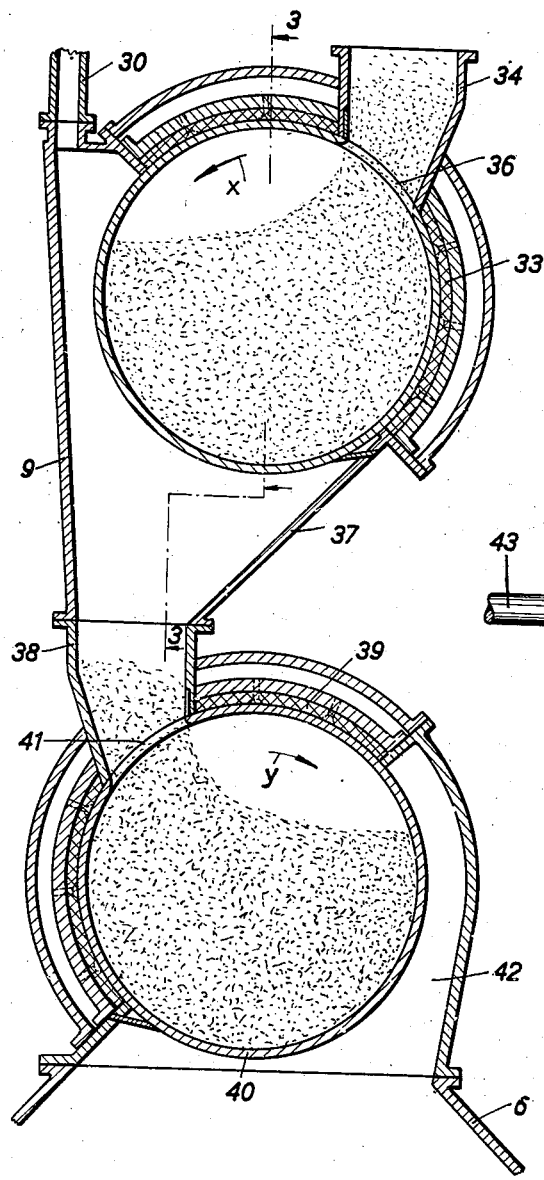
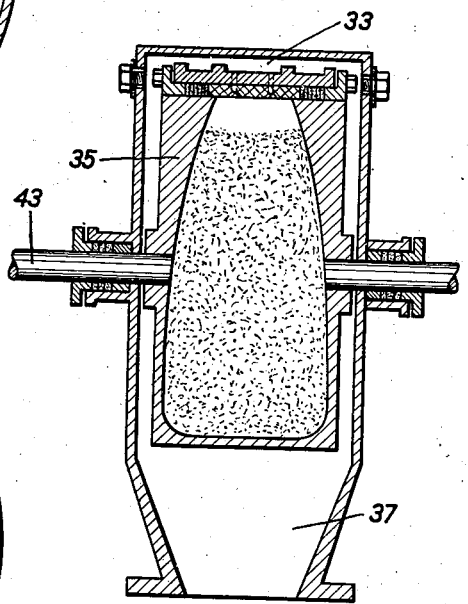
Inventor:
Karl Dienst
By: Mason & Porter
Attorneys

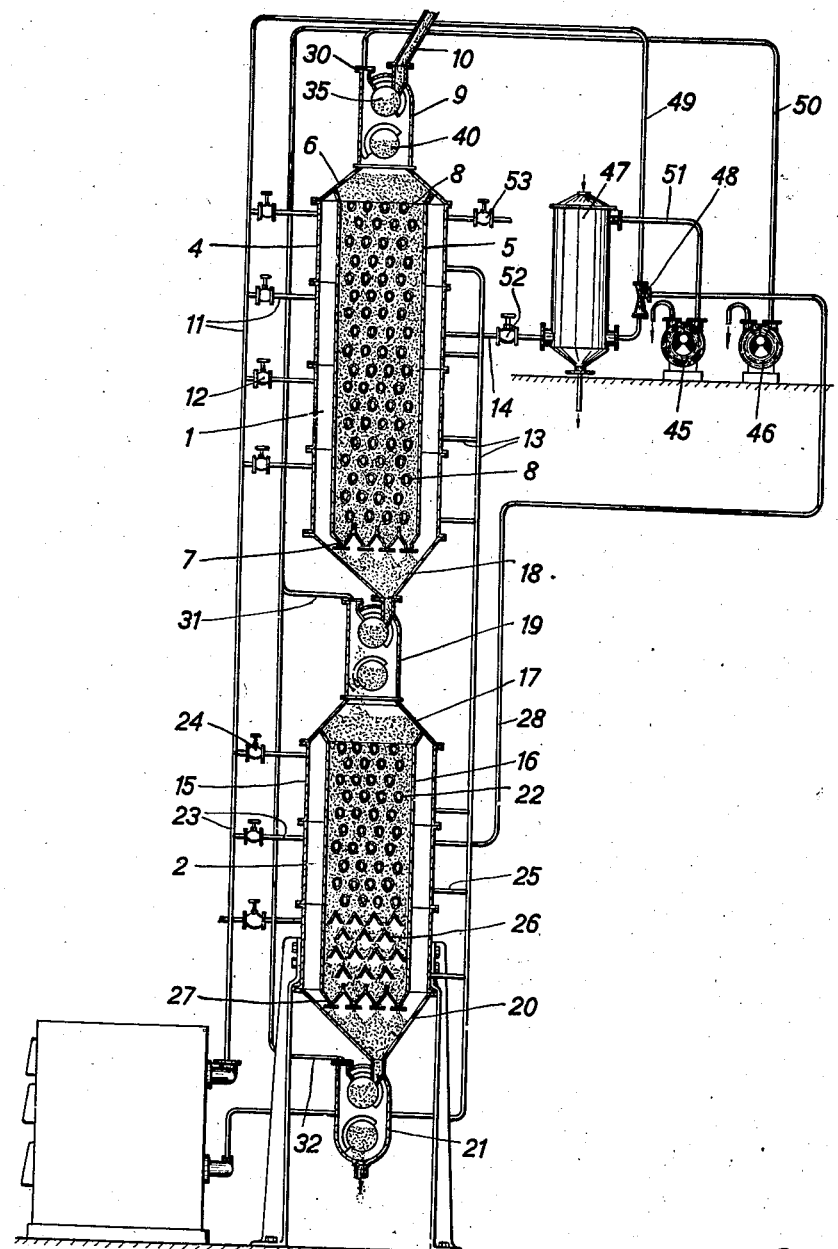

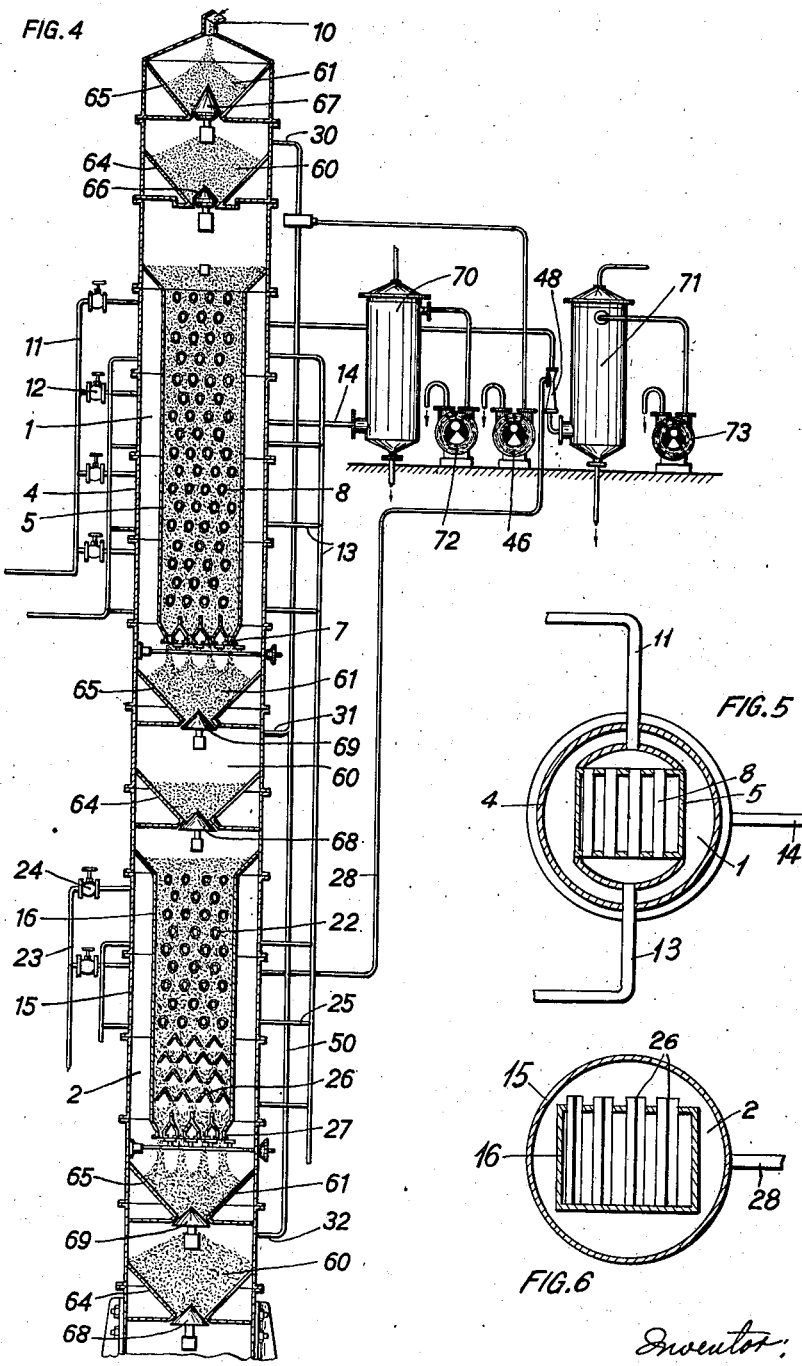

Patented May 19, 1942

2,283,319

UNITED STATES PATENT OFFICE 2,283,319

VERTICAL GRAIN DRIER

Karl Dienst, Hildesheim, Germany

Application June 11, 1938, Serial No. 213,277
In Germany June 18, 1937

2 Claims. (Cl. 34—92)

My invention relates to improvements in vertical grain driers, and more particularly in grain driers of the type described in the patent of the United States No. 2,073,553 granted to me March 9, 1937, and comprising a grain supplying chamber provided near the top end of the apparatus, a grain delivering chamber provided near the bottom end thereof, and a heated vacuum chamber located between the said top and bottom chambers, the said vacuum chamber being subdivided into three sections, the upper one being used for storing the grain, the median one being heated for vaporising the humidity, and the lower one acting as a container for the treated goods. The object of the improvements is to provide an apparatus of this class by means of which a further amount of humidity may be withdrawn from the grain delivered from the vacuum drier, and the grain is cooled to initial temperature, and with this object in view my invention consists in connecting the said vacuum drier, through a sluice or sluices, with a vacuum apparatus having a heating section mounted therein, means being provided for maintaining a vacuum within the said vacuum apparatus which is higher than the vacuum within the vacuum drier, so that the grains coming from the vacuum drier are simultaneously dried and cooled.

The grain flowing into this vacuum apparatus is immediately cooled by the increased vacuum causing a partially vaporisation of the humidity contained within the grains, and thereafter this so cooled grain is exposed to the action of the heating section which causes further vaporisation by the high vacuum and by heating the grain, without causing an increase of temperature in the body of the grain. Finally the grain which has thus been treated, still exposed to the high vacuum without further heating, in order to remove the rest of moisture desired and finally cooling the same to low temperature, say to about 15 to 20° or 25° C., at which the grain may be stored.

Preferably a vacuum apparatus of the construction shown in the said Patent 2,073,553 or a similar drier is connected through a sluice to the said vacuum drier.

For the purpose of explaining the invention two examples embodying the same have been shown in the accompanying drawings in which the same reference characters have been used in all the views to indicate corresponding parts. In said drawings, Fig. 1 is a somewhat diagrammatical sectional elevation showing the apparatus, Fig. 2 is a detail sectional elevation on an enlarged scale showing one of the sluices controlling the flow of the grain, Fig. 3 is a sectional elevation taken on the line 3—3 of Fig. 2, and Fig. 4 is a sectional elevation similar to the one shown in Fig. 1 and illustrating another modification.

Figure 5 is a transverse sectional view through the upper portion of the upper vertical shaft of Figure 1 showing the manner in which the steam conduits communicate with the heating elements.

Figure 6 is a similar transverse sectional view through the lower portion of the lower shaft of Figure 1, showing the roof-shaped members.

In the example shown in Figs. 1 to 3 the apparatus comprises an upper member 1 and a lower member 2 both constructed in the form of shafts and disposed vertically one above the other. The construction of the upper member is similar to the drying apparatus shown in the patent of the United States No. 2,073,553 granted to me March 9, 1937, and it comprises a vertical shaft 4, the body 5 disposed therein and secured to the conical head 6 of the shaft 4 and provided at its bottom with a set of outlets 7. Transversely of the body 5 tubular heating members 8 are provided through which a suitable heating medium such as steam is circulated which is supplied through pipes 11 including valves 12, the waste steam or water of condensation being removed through pipes 13. To the head 6 a valve-chamber 9 is secured which contains valves controlling the supply of grain from a shoot 10 to the body 5, the said valves being constructed so that the grain may be intermittently supplied without connecting the vertical shaft 4 with the outer air. On the other hand the shaft 4 is connected by a pipe 14 to an evacuating system which will be described hereinafter.

The member 2 comprises a shaft 15 and a body 16 disposed therein and fixed at its top to a head 17 of the shaft 15. The head 17 of the shaft 15 is connected with a conical bottom part 18 of the shaft 4 through a valve chamber 19, and its conical bottom part 20 is connected with a valve chamber 21. The said valve chambers 19 and 21 are similar in construction to the valve chamber 9, and are likewise adapted to deliver grain without permitting exchange of the pressure within the shafts 4 and 15 and also with the outer air, as will be described hereinafter. The body 16 is provided at its top part with radiators 22 connected with a supply of heating steam through pipes 23 including valves 24 and with a pipe 25 through which the waste steam or water of condensation is removed. Within the bottom part of the cylinder 16 roof shaped members 26 are located which extend therethrough and are in communication with the shaft 15 for withdrawing the desired rest of evaporated moisture from the cooling grains. The bottom of the cylinder is provided with a set of outlets 27 through which the grain is delivered in uniform flow from the body 16 into the conical bottom part 20. The shaft 15 is connected through a pipe 28 with the evacuating means for the evaporated moisture. Further, the chambers 9, 19 and 21 are likewise connected through pipes 30, 31 and 32 with the evacuating means for the air.

The construction of the chamber 9 and its valves is shown in Figs. 2 and 3, and it will be understood that the construction of the chambers 19 and 21 and the valves mounted therein may be the same as that of the valve chamber 9.

As shown in the said figures the chamber 9 comprises a segmental top part 33 which is provided with an intake 34. Within the said segmental part 33 a cylindrical valve 35 is rotatably mounted, which is provided with an opening 36 adapted to communicate with the intake 34 and with the inner part of the chamber 9. Below the segmental portion 33 the chamber 9 is contracted into the form of a funnel 37, and the said funnel is connected through a portion 38 with a segmental portion 39 in which a cylindrical valve 40 is rotatably mounted. The said valve is provided with an opening 41 adapted to communicate with the intake 38 and with the bottom part 42 of the chamber 9 which is connected with the head 6 of the shaft 4. As appears from Fig. 3, the valves 35 and 40 are mounted on shafts, the said figures showing the shaft 43 of the upper valve 35.

The operation of the valves is as follows: In the position of the parts shown in Fig. 2 the upper valve 35 is connected through the intake 34 with the grain supply, and the lower valve 40 is connected with the funnel shaped part 37 of the chamber 9. Thus the chamber 9 is disconnected from the intake 34 and also from the shaft 4, and a vacuum is maintained therein by the evacuating means for air. After the valve 35 has been filled the valves 35 and 40 are rotated respectively anti-clockwise and clockwise, as is indicated by the arrows $x$ and $y$. Thereby the inner parts of the valves 35 and 40 are temporarily disconnected from the intake 34, the funnel 37 and the bottom part 42 of the valve chamber and the shaft 4 connected therewith. When the valves are further rotated in the same directions the opening 36 gets into position for delivering the grain contained therein into the funnel 37, and the vacuum within the said funnel is transmitted to the valve 35. The grain is now stored within the funnel 37. In the meantime the valve 40 has continued its rotary movement, and it has delivered the grain contained therein through the bottom part 42 and the head 6 into the shaft 4. Upon further rotation of the valves 35 and 40 which now are empty, the opening 36 gets again into the position in which it is closed by the segmental portion 33, and thereafter into the position shown in Fig. 2 in which another charge of grain is supplied thereto. In a similar way the valve 40 first gets into the position in which the opening 41 is closed by the segment 39, and thereafter into the position shown in Fig. 2 in which it communicates with the funnel 37. Thus the grain contained within the said funnel flows into the valve 40.

The evacuating means for the evaporated moisture shown in Fig. 1 comprises two suction pumps 45 and 46, a condenser 47 and an ejector 48 connected through a pipe 49 with the steam supply 11. The valve chambers 9, 19 and 21 are for evacuating the air connected by a pipe 50 with the suction pump 46, and the suction pump 45 is connected by a pipe 51 with the condenser 47. The said condenser is connected by the aforesaid pipe 14 including a valve 52 with the shaft 4. By means of the valve 52 or a vent 53, or both the vacuum within the shaft 4 is controlled. The shaft 15 is connected by the pipe 28 with the suction part of the ejector 48 which delivers into the condenser 47. Thus the vacuum created within the shaft 15 can be higher than that created within the shaft 4.

The operation of the apparatus is as follows: The grain is supplied through the shoot 10 into the valve cylinder 35 which is in the position shown in Fig. 2. The chamber 37 has been evacuated through the pipe 30 by means of the suction pump 46. The cylinder 35 is turned in the direction of the arrow $x$. Thereby it is at first closed as against the intake 34, and thereafter it opens into the chamber 37. The vacuum within the chamber 37 is transmitted to the cylinder 35 and it is again raised to its normal degree by the continued action of the suction pump 46. The grain is delivered into the bottom part of the chamber 37 and it is taken away by the cylinder 40, which turns into the direction of the arrow, for delivering grain to the body 5 into the shaft 4. Thus by the combined action of the cylinders 35 and 40 loss of vacuum within the shaft 4 is avoided.

The grain drizzles within the shaft 4 downwardly, and it is heated by the radiators 8. By the heat thus imparted to the grain and the vacuum created within the shaft 4 the moisture of the grain is vaporized, is removed by the suction pump 45 and the condenser 47. The grain has a uniform flow through the body 5 by reason of the outlets 7 provided at the bottom of the said body. The grain is now taken up by the conical bottom 18 of the shaft 4, and it is delivered therefrom to the body 16 through the valve chamber 19 which has a function similar to that of the valve chamber 9. Within the body 16 the grain drizzles downwardly, and in the top part of the said cylinder it is further heated by the radiators 22. In the bottom part of the cylinder the grain is not heated any more, but it is subject to the rest-evaporisation, the roof shaped members facilitate the drawing off of the vapor from the inner parts of the body of the grain. Further, the vacuum created within the shaft 15 by the ejector 48 is higher than that created within the shaft 4, and thus the grain is finally dried and cooled off to a temperature of from 15 to 20°–25° C. at which it is ready for storing. Finally the grain is removed through the valve chamber 21.

An important advantage of the vacuum drier, combined with the additional vacuum apparatus is that the grain uniformly drizzles through the both apparatuses while it is subject to the treatment by heat, by continuously transmitting the same from the upper shaft to the lower one, whereby the grain is uniformly dried and cooled as much as desired.

By my improved apparatus the grain to be used for baking bread is prepared prior to grinding by treatment at different temperatures. Thereby the grain is uniformly heated all through its mass and the flour ground from the said grain has high baking properties. In the operation of the apparatus the heat and the vacuum should be regulated so that the grain is heated within the predetermined limits of temperature, time and amount of calories. The exact temperature, the period of time during which the said temperature acts on the grain, and the total amount of calories to be applied are different for each kind of grain by reason of the different content in glutinous matter in the grain, and it is preferred to ascertain the same by a preliminary test in which the amount of calories consumed is measured as the difference between the heat content of the heating medium supplied to and removed from the apparatus, the result of the said test being subsequently used in the normal operation of the apparatus.

In my improved apparatus the temperature and the vacuum may be easily varied in the course of the process.

In the construction shown in the figures the drying apparatus 1 and the vacuum apparatus 2 consist of two sections which are separated from each other by the valve chamber 19. But I wish it to be understood that my invention is not limited to this feature and that the whole apparatus may be connected together also by a single valve with a delivering and filling device similar for instance to the valve 35 in the chamber 79.

My improved apparatus may also be used for treating the grain in a special way. For example, the vacuum and the temperature may be controlled so that the grain is dampened at elevated temperature in the upper apparatus 1 and dried at deep temperature within the lower apparatus 2, or the said vacuum and temperature may be controlled in such a way that the grain is simultaneously dampened and dried at elevated temperature in the upper apparatus 1 and cooled, further dried and brought down to deep temperature within the lower apparatus 2.

The improved apparatus is further useful for improving the baking property of the grain. Thus the grain may be first treated with an excess of moisture up to swelling, and thereafter heated at high temperature of from 40 to 65° C., preferably from 45 to 60° C., in vacuo, and so that the excess of moisture is removed also from the inner parts of the body of the grain.

In the modification shown in Fig. 4 the general construction of the apparatus is the same as has been described with reference to Fig. 1, and the same letters of reference have been used to indicate corresponding parts, so that it is not necessary to repeat the description of the apparatus. Instead of the valve construction shown in Fig. 2 a valve construction is provided which has the same function, and which is adapted to prevent access of air to the shaft 4 and exchange of the vacuum between the shafts 4 and 15. The top part of the shaft 4 comprises two chambers 60 and 61 which are separated from each other and from the main part of the shaft 4 and the body 5 by the funnels 64 and 65 which are adapted successively to receive the grain, the said grain being supplied through the chute 10. At their bottoms the funnels are closed by valves 66 and 67. Similar chambers 60 and 61 and funnels 64 and 65 are provided between the upper shaft 4 and the lower shaft 15, and below the said shaft 15, the said funnels being closed by valves 68 and 69. The chambers 60 are connected through the pipes 30, 31, 32 and 50 with the suction pump 46. As shown, the shafts 4 and 15 are connected with condensers 70 and 71 and suction pumps 72 and 73, and the pipe 28 includes the ejector 48.

The valves 66, 67 and 68, 69 are operated by electrical, hydraulic or mechanical means.

The operation of the apparatus is the same as that described with reference to Fig. 1.

Instead of heating the body of grain by means of the radiator 8, a medium may be circulated through the same the temperature of which is lower than that of the grain supplied to the apparatus and higher than the vaporisation temperature at the vacuum produced within the apparatus.

I claim:

1. An apparatus for drying grain, comprising an upper vacuum drier of the flow type, a valve discharging device for delivering grain into said upper drier, heating elements in said upper drier, a lower vacuum drier of the flow type, heating elements in said lower vacuum drier, a valved connecting mechanism between the upper drier and lower drier for controlling the discharge of grain from said upper drier to said lower drier and serving to seal the upper drier with respect to the lower drier, a valve discharging device at the bottom of said lower drier for discharging grain therefrom, suction means for maintaining said valve charging device, said valved connecting mechanism and said valve discharging device under vacuum whereby to prevent the access of external air to the upper and lower driers and to isolate the lower drier from the upper drier, vacuum pumping means, and means including a condenser connected to said pumping means and to said upper drier for producing a vacuum in said upper drier, and an ejector having the suction part thereof connected to said lower drier for producing a higher vacuum in said lower drier than the vacuum created in said upper drier.

2. An apparatus for drying grain, comprising an upper vacuum drier of the flow type, tubular heating elements in said upper drier and over which the grain is adapted to pass, a lower vacuum drier of the flow type, tubular heating elements in the upper portion of said lower vacuum drier and over which the grain is adapted to pass, a valve charging device for delivering grain into said upper drier, a valved connecting mechanism between the bottom of the upper drier and the top of the lower drier for controlling the discharge of grain from said upper drier to said lower drier and serving to seal the upper drier with respect to the lower drier, a valve discharging device at the bottom of said lower drier for discharging grain therefrom, suction means for maintaining said valve charging device, said valved connecting mechanism and said valve discharging device under vacuum whereby to prevent the access of external air to the upper and lower driers and to isolate the lower drier from the upper drier, conduit means for delivering steam to the tubular heating elements in said upper and lower driers, a condenser connected to the upper vacuum drier, a vacuum pump connected to said condenser for creating a vacuum in said upper vacuum drier, and an ejector connected to said condenser with the suction part thereof connected to said lower vacuum drier for creating a higher vacuum in said lower drier than the vacuum created in said upper drier.

KARL DIENST.